US010053553B2

(12) United States Patent
Yukimura et al.

(10) Patent No.: US 10,053,553 B2
(45) Date of Patent: Aug. 21, 2018

(54) RUBBER COMPOSITION, AND PNEUMATIC TIRE USING SAME

(71) Applicants: BRIDGESTONE CORPORATION, Tokyo (JP); OTSUKA CHEMICAL CO., LTD., Osaka-shi, Osaka (JP)

(72) Inventors: Noriaki Yukimura, Kodaira (JP); Takahiro Yoshizawa, Kodaira (JP); Kazuhiro Kodama, Tokushima (JP); Hiroaki Yuasa, Itano-gun (JP); Noriaki Shiina, Tokushima (JP); Takashi Sato, Tokushima (JP); Hiroyuki Ishitobi, Awa (JP); Mifuyu Ueno, Itano-gun (JP); Shinya Nakashima, Itano-gun (JP); Masaki Abe, Itano-gun (JP)

(73) Assignees: BRIDGESTONE CORPORATION, Tokyo (JP); OTSUKA CHEMICAL CO., LTD., Osaka (JP)

( * ) Notice: Subject to any disclaimer, the term of this patent is extended or adjusted under 35 U.S.C. 154(b) by 169 days.

(21) Appl. No.: 14/764,205

(22) PCT Filed: Jan. 30, 2014

(86) PCT No.: PCT/JP2014/052173
§ 371 (c)(1),
(2) Date: Jul. 29, 2015

(87) PCT Pub. No.: WO2014/119694
PCT Pub. Date: Aug. 7, 2014

(65) Prior Publication Data
US 2015/0361248 A1 Dec. 17, 2015

(30) Foreign Application Priority Data

Jan. 30, 2013 (JP) ................. 2013-016262

(51) Int. Cl.
| C08K 5/36 | (2006.01) |
| C08K 5/3415 | (2006.01) |
| C08K 5/3417 | (2006.01) |
| B60C 11/00 | (2006.01) |
| B60C 1/00 | (2006.01) |
| C08K 3/00 | (2018.01) |
| C08K 5/31 | (2006.01) |
| C08L 7/00 | (2006.01) |
| C08L 9/00 | (2006.01) |
| C08K 3/04 | (2006.01) |
| C08K 5/3445 | (2006.01) |
| C08K 5/3462 | (2006.01) |
| C08K 5/3447 | (2006.01) |

(52) U.S. Cl.
CPC .............. *C08K 5/36* (2013.01); *B60C 1/00* (2013.01); *B60C 1/0016* (2013.01); *B60C 11/00* (2013.01); *C08K 3/00* (2013.01); *C08K 3/04* (2013.01); *C08K 5/31* (2013.01); *C08K 5/3415* (2013.01); *C08K 5/3417* (2013.01); *C08K 5/3445* (2013.01); *C08K 5/3447* (2013.01); *C08K 5/3462* (2013.01); *C08L 7/00* (2013.01); *C08L 9/00* (2013.01); *B60C 2200/065* (2013.01)

(58) Field of Classification Search
CPC ................................ C08K 5/3417; C08K 5/36
See application file for complete search history.

(56) References Cited

U.S. PATENT DOCUMENTS

| 6,515,055 | B1 | 2/2003 | Nohara et al. | |
| 6,667,356 | B2 * | 12/2003 | Nohara | C08K 5/29 524/195 |
| 2001/0034389 | A1 * | 10/2001 | Vasseur | C08K 5/31 524/137 |
| 2003/0134947 | A1 | 7/2003 | Nohara et al. | |
| 2005/0187340 | A1 | 8/2005 | Blanchard et al. | |
| 2014/0155524 | A1 * | 6/2014 | Shimizu | C08K 3/36 524/91 |

FOREIGN PATENT DOCUMENTS

| JP | S61-221241 A | 10/1986 |
| JP | S61-221242 A | 10/1986 |
| JP | 62-184036 A | 8/1987 |
| JP | 9-278942 A | 10/1997 |
| JP | 10-330549 A | 12/1998 |
| JP | 2000-239446 A | 9/2000 |
| JP | 2004-26924 A | 1/2004 |
| JP | 2005-529221 A | 9/2005 |
| JP | 2009/019098 A | 1/2009 |
| JP | 2011-89031 A | 5/2011 |

(Continued)

OTHER PUBLICATIONS

International Search Report for PCT/JP2014/052173 dated Apr. 22, 2014 [PCT/ISA/210].
Seki, Teruya et al., "Studies on 2-Benzimidazolethiol Derivatives. III. Pyrolysis of 2-(ω-Hydroxy-and ω-amino-alkyl)-Derivatives and 1-(2-Diethyl-aminoethyl)-2-chlorobenzimidazole.", Yakugaku Zasshi, 1966, vol. 86, No. 8, pp. 665-673 (total 10 pages).
Communication dated Aug. 17, 2016 from the State Intellectual Property Office of the P.R.C. in counterpart Application No. 201480006424.7.
Communication dated Sep. 22, 2016 from the European Patent Office in counterpart Application No. 14745896.2.

*Primary Examiner* — Peter D. Mulcahy
(74) *Attorney, Agent, or Firm* — Sughrue Mion, PLLC

(57) ABSTRACT

The invention provides a rubber composition prepared by mixing, per 100 parts by mass of a rubber component comprising at least 50% by mass of a diene-based rubber, from 20 to 150 parts by mass of a filler, and from 0.05 to 30 parts by mass of a compound A which has a specific guanidine structure and has a functional group reactive with the diene-based rubber. The rubber composition improves both a high elastic modulus and a low tan δ. The invention also provides a pneumatic tire using the rubber composition.

4 Claims, No Drawings

(56) References Cited

FOREIGN PATENT DOCUMENTS

WO         02/094928 A1    11/2002
WO      2012/031183 A2     3/2012

\* cited by examiner

RUBBER COMPOSITION, AND PNEUMATIC TIRE USING SAME

CROSS REFERENCE TO RELATED APPLICATIONS

This application is a National Stage of International Application No. PCT/JP2014/052173, filed on Jan. 30, 2014, which claims priority from Japanese Patent Application No. 2013-016262, filed on Jan. 30, 2013, the contents of all of which are incorporated herein by reference in their entirety.

TECHNICAL FIELD

The present invention relates to a rubber composition satisfying both a high elastic modulus and a low-heat-generation property, and relates to a pneumatic tire obtained using the rubber composition.

BACKGROUND ART

While running, heavy-load pneumatic tires for trucks, busses and the like, or off-road tires, especially the rubber composition arranged in the tread part thereof are repeatedly given a great strain amplitude, and the tire temperature is thereby turned up. Consequently, for prolonging the life of tires, the tire temperature increase must be prevented. For preventing the tire temperature increase, it is desirable that the tire tread rubber is prevented from being deformed by increasing the elastic modulus thereof in a high-temperature range, and/or the low-heat-generation property of the tire tread rubber composition is improved, or that is, tan δ thereof is lowered.

In already-existing pneumatic tires, the amount of the filler such as carbon black or the like in a rubber composition is increased or an additive such as a resin or the like is added to the composition for improving the elastic modulus of the composition. In this case, however, there occur problems in that the viscosity of the unvulcanized rubber composition increases owing to the increase in the amount of the filler so that the workability during kneading of the composition worsens, or tan δ of the vulcanized rubber composition increases.

On the other hand, for lowering tan δ, the type and the amount of the carbon black to be in the rubber composition are changed, for example, the particle size of the carbon black is increased or the amount of the carbon black is decreased. However, these methods lower the abrasion resistance of the tread rubber and lower the fracture resistance such as cutting resistance and chipping resistance thereof, and after all, it is difficult to improve the low-heat-generation property of the rubber composition by changing the type and the amount of carbon black to be in the composition. In addition, it is known that, when carbon black is substituted with silica and is used along with a silane coupling agent, then tan δ can be reduced; however, the abrasion resistance and the fracture resistance of the rubber composition are lowered and the durability of tires is thereby worsened.

As opposed to this, in PTL 1, it has been found that addition of a hydrazide compound can improve the low-heat-generation property with neither increasing the Mooney viscosity of the resultant composition nor lowering the abrasion resistance and the fracture resistance thereof.

However, it is desired to provide a rubber composition satisfying a high elastic modulus and a low tan δ both on a further higher level.

CITATION LIST

Patent Literature

PTL 1; JP-A 10-330549

SUMMARY OF INVENTION

Technical Problem

Given the situation, an object of the present invention is to provide a rubber composition capable of satisfying both a high elastic modulus and a low tan δ and to provide a pneumatic tire using the rubber composition.

Solution to Problem

For solving the above-mentioned problems, the present inventors investigated in detail molecular structures having high reactivity with polymer and molecular structures having high chemical interactivity with filler such as carbon black or the like. With that and as a result of investigations of various compounds, the present inventors have found that, as a molecular structure having reactivity heretofore not known in the art, incorporation of a compound having a guanidine structure and having a functional group reactive with a diene-based rubber can solve the above-mentioned problems, and have completed the present invention.

Specifically, the present invention provides a rubber composition prepared by mixing, per 100 parts by mass of a rubber component comprising at least 50% by mass of a diene-based rubber, from 20 to 150 parts by mass of a filler, and from 0.05 to 30 parts by mass of a compound A which has a guanidine structure represented by the following formula (I) and has a functional group reactive with the diene-based rubber, and provides a pneumatic tire using the rubber composition.

(I)

Advantageous Effects of Invention

According to the present invention, the addition of the compound A having a guanidine structure represented by the above-mentioned formula (I) and having a functional group reactive with a diene-based rubber (hereinafter this may be abbreviated as "compound A") improves the chemical interaction between the filler and the rubber component and exhibits the following effects.

(1) The reinforcing performance of the filler is improved. In particular, the reinforcing performance of carbon black is improved. With that, the hysteresis loss owing to the filler particles in friction is reduced and, as a result, the composition secures both a high elastic modulus and a low tan δ. Further, the reinforcing performance of an inorganic filler, especially silica for the rubber component is also improved, and therefore even the rubber composition containing both carbon black and an inorganic filler such as silica or the like as the filler component can still secure both a high elastic modulus and a low tan δ.

(2) Along with the above-mentioned effect (1), in particular, the guanidine structure that contains an amide structure (where a carbonyl group directly bonds to the nitrogen atom in the guanidine structure) improves the scorching resistance of the rubber composition (that is, prolongs the scorch time for the composition) while maintaining the high elastic modulus and the low tan δ.

(3) The reinforcing performance of the inorganic filler, especially silica can be improved, and therefore the amount of the silane coupling agent to be incorporated may be reduced and, as a result, the unreacted silane coupling agent in the unvulcanized rubber composition can be thereby reduced and the rubber scorching during the unvulcanized rubber composition working step can be prevented.

DESCRIPTION OF EMBODIMENTS

The present invention is described in detail hereinunder.

The rubber composition of the present invention prepared by mixing, per 100 parts by mass of the rubber component comprising at least 50% by mass of a diene-based rubber, from 20 to 150 parts by mass of a filler, and from 0.05 to 30 parts by mass of a compound A which has a guanidine structure represented by the following formula (I) and has a functional group reactive with the diene-based rubber.

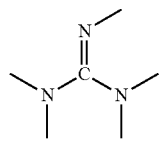

(I)

The guanidine structure represented by the above-mentioned formula (I) effectively reacts with the filler and, as cooperating with the functional group reactive with the diene-based rubber, enhances the chemical interaction between the filler and the rubber component while assisting the rubber composition to have a high elastic modulus and a low tan δ.

[Compound A]

The compound A in the present invention has a guanidine structure represented by the above-mentioned formula (I) and has a functional group reactive with a diene-based rubber.

The guanidine structure preferably forms a hetero ring represented by the following formula (II-1) or (II-2).

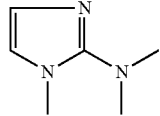

(II-1)

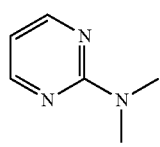

(II-2)

In the case where the guanidine structure forms the hetero ring represented by the above-mentioned formula (II-1) or (II-2), since the guanidine structure has an aromatic property, the affinity of the guanidine structure with a carbon black skeleton is increased, and therefore the chemical interaction between the compound A and carbon black is thereby further increased. Accordingly, both the high elastic modulus and the low tan δ of the rubber composition can be improved on a higher level. From the viewpoint of the aromatic property thereof, an aromatic ring may be condensed with the guanidine structure of the above-mentioned formula (II-1) or (II-2) to form a multicyclic structure. As the aromatic ring, 4- to 7-membered rings are exemplified, and preferred are a 5-membered ring and a 6-membered ring.

The guanidine structure in the present invention preferably has an amide structure represented by the following formula (III) in which a carbonyl group directly bonds to the nitrogen atom in the guanidine structure. Having the structure, the compound may prolong the scorch time for the unvulcanized rubber composition, and the unvulcanized rubber composition therefore exhibits better workability.

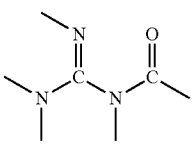

(III)

The compound A in the present invention has, along with the above-mentioned guanidine structure therein, a functional group reactive with a diene-based rubber. The functional group reactive with a diene-based rubber is preferably at least one selected from a polysulfide group, a thiol group (also referred to as a mercapto group), a hydrazide group and a hydrazone group, from the viewpoint of the efficient reactivity thereof with a diene-based rubber to form a tougher reinforcing layer of the rubber composition.

More preferably, the compound A in the present invention is a compound selected from the compounds represented by the following formula (A1) and the compounds represented by the following formula (A2), from the viewpoint that the compound can effectively react with a diene-based rubber to cause the rubber composition to have both a high elastic modulus and a low tan δ.

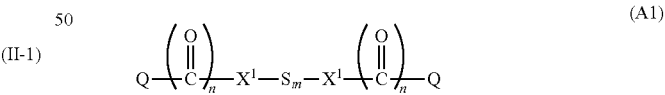

(A1)

[In the formula, $X^1$ represents an alkylene group having from 1 to 7 carbon atoms. m indicates an integer of 1 or 2, n indicates 0 or 1. Q represents a functional group of any of the following Q1 to Q7. In Q1 to Q7, $R^1$ represents a phenyl group, $R^2$ represents a hydrogen atom or a phenyl group, $R^3$ and $R^4$ may be the same or different, each representing a hydrogen atom, an alkyl group having from 1 to 4 carbon atoms, or a phenyl group. However, compounds where Q is Q5, $R^2$ is a hydrogen atom, $X^1$ is an ethylene group, m is 2 and n is 0 are excluded.]

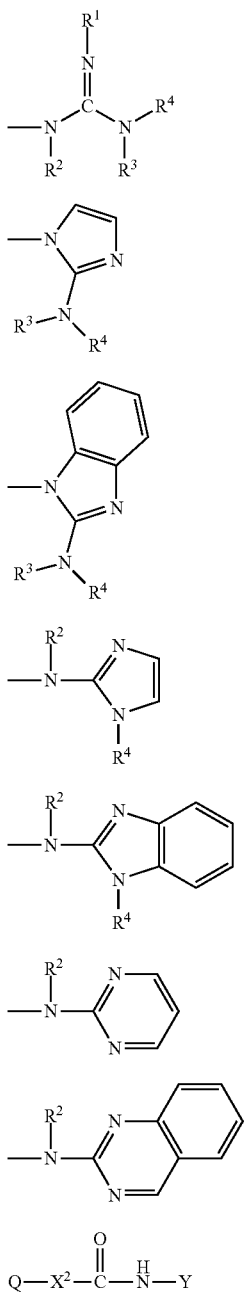

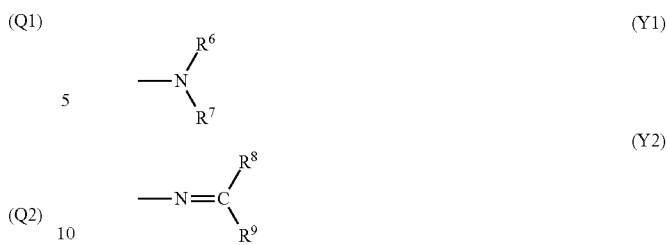

[In the formula, Q represents a functional group of any of Q1 to Q7 that are the same as in the compounds represented by the above-mentioned formula (A1). $X^2$ represents an alkylene group having from 1 to 4 carbon atoms. Y represents the following functional group (Y1) or the following functional group (Y2). In the functional group (Y1), $R^6$ and $R^7$ may be the same or different, each representing a hydrogen atom, an alkyl group having from 1 to 4 carbon atoms, or a phenyl group. In the functional group (Y2), $R^8$ and $R^9$ may be the same or different, each representing a hydrogen atom, an alkyl group having from 1 to 6 carbon atoms, or a phenyl group. $R^8$ and $R^9$ may bond to each other to form an alkylene group having from 2 to 7 carbon atoms. However, compounds where Q is Q3, $R^3$ and $R^4$ are hydrogen atoms, and $X^2$ is a methylene group are excluded.]

The groups shown in this description are as follows.

The alkyl group having from 1 to 4 carbon atoms is a straight-chain or branched-chain alkyl group having from 1 to 4 carbon atoms, including, for example, a methyl group, an ethyl group, an n-propyl group, an isopropyl group, an n-butyl group, an isobutyl group, a sec-butyl group, a tert-butyl group, etc.

The alkyl group having from 1 to 6 carbon atoms is a straight-chain or branched-chain alkyl group having from 1 to 6 carbon atoms, including, for example, the substituents exemplified above for the alkyl group having from 1 to 4 carbon atoms and, in addition thereto, an n-pentyl group, an isopentyl group, a neopentyl group, a tert-pentyl group, an n-hexyl group, an isohexyl group, etc.

The alkylene group having from 1 to 4 carbon atoms includes, for example, a methylene group, an ethylene group, a trimethylene group, a tetramethylene group. These alkylene groups may have a substituent, and in these, any carbon atom may be substituted with one or more atoms selected from a nitrogen atom, an oxygen atom and a sulfur atom. The alkylene groups of those types include, for example, —CH$_2$NHCH$_2$—, —CH$_2$NHCH$_2$CH$_2$—, —CH$_2$OCH$_2$CH$_2$—, —CH$_2$SCH$_2$CH$_2$—, etc.

The alkylene group having from 1 to 7 carbon atoms includes, for example, a methylene group, an ethylene group, a trimethylene group, a tetramethylene group, a pentamethylene group, a hexamethylene group, a heptamethylene group. These alkylene groups may have a substituent, and in these, any carbon atom may be substituted with one or more atoms selected from a nitrogen atom, an oxygen atom and a sulfur atom. The alkylene groups of those types include, for example, —CH$_2$NHCH$_2$—, —CH$_2$NHCH$_2$CH$_2$—, —CH$_2$NHNHCH$_2$—, —CH$_2$CH$_2$NHCH$_2$CH$_2$—, —CH$_2$NHNHCH$_2$CH$_2$—, —CH$_2$NHCH$_2$NHCH$_2$—, —CH$_2$CH$_2$CH$_2$NHCH$_2$CH$_2$CH$_2$—, —CH$_2$OCH$_2$CH$_2$—, —CH$_2$CH$_2$OCH$_2$CH$_2$—, —CH$_2$SCH$_2$CH$_2$—, —CH$_2$CH$_2$SCH$_2$CH$_2$—, etc.

The alkylene group having from 2 to 7 carbon atoms includes those exemplified hereinabove for the alkylene group having from 1 to 7 carbon atoms except a methylene group.

In the case where the compounds represented by the general formula (A1) or (A2) in the present invention include geometric isomers derived from the carbon-carbon double bond or the carbon-nitrogen double bond in the structural formula thereof, not only the respective geometric isomers but also any mixture containing such geometric isomers in any ratio thereof all are encompassed in the present invention.

In the present invention, of the compounds represented by the formula (A1), those where Q is selected from Q1, Q3, Q5 and Q6 are more preferred from the viewpoint that the rubber composition exhibits both a high elastic modulus and a low tan δ; and even more preferred are those where Q is selected from Q1, Q3 and Q5. However, it is desirable that, from the compounds represented by the formula (A1), those where $R^2$ is a hydrogen atom, $X^1$ is an ethylene group, m is 2 and n is 0 are excluded.

Further, of the compounds represented by the formula (A1) where Q is Q1, preferred are those where at least one of $R^1$ and $R^3$ is a phenyl group, from the viewpoint that the rubber composition exhibits both a high elastic modulus and a low tan δ.

With respect to the compounds represented by the formula (A1), preferred are those where n is 1, and also preferred are those where m is 2. With respect to the compounds represented by the formula (A1), preferred are those where $X^1$ is a group selected from an alkylene group having from 1 to 5 carbon atoms such as a methylene group, an ethylene group, a trimethylene group, a tetramethylene group, a pentamethylene group, a group —CH$_2$CH$_2$OCH$_2$CH$_2$— or the like; and more preferred are those where the group is selected from a methylene group, an ethylene group and a group —CH$_2$CH$_2$OCH$_2$CH$_2$—.

With respect to the compounds represented by the formula (A1) where Q is Q3, preferred are those where $R^3$ is a phenyl group, and also preferred are those where $R^3$ and $R^4$ are hydrogen atoms, those where $R^3$ and $R^4$ are methyl groups, and those where $R^3$ is a methyl group and $R^4$ is a phenyl group.

With respect to the compounds represented by the formula (A1) where Q is Q5, preferred are those where $R^2$ is a phenyl group, and $R^4$ is a hydrogen atom.

With respect to the compounds represented by the formula (A1) where Q is Q5, preferred are those where n is 0 and $R^2$ is a phenyl group; and also preferred are those where n is 0 and $X^1$ is a group —CH$_2$CH$_2$OCH$_2$CH$_2$—, and those where n is 1.

With respect to the compounds represented by the formula (A2) in the present invention, preferred are those where Q is a group selected from Q1, Q3 and Q5.

With respect to the compounds represented by the formula (A2), more preferred are those where Q is Q1. With respect to the compounds represented by the formula (A2), even more preferred are those where Q is Q1 and at least one of $R^1$ and $R^3$ is a phenyl group.

With respect to the compounds represented by the formula (A2), preferred are those where Q is Q3. However, the compounds where $R^3$ and $R^4$ are hydrogen atoms and $X^2$ is a methylene group are excluded.

With respect to the compounds represented by the formula (A2), preferred are those where $R^1$ and $R^3$ each are a phenyl group and Y is the functional group (Y1).

With respect to the compounds represented by the formula (A2), preferred are those where Q is Q5 and Y is the functional group (Y1); and more preferred are those where $R^6$ and $R^7$ are hydrogen atoms.

With respect to the compounds represented by the formula (A2), preferred are those where Q is Q5 and Y is the functional group (Y2); and more preferred are those where $R^8$ is a methyl group, and $R^9$ is an isobutyl group.

With respect to the compounds represented by the formula (A2), more preferred are those where $X^2$ is a methylene group or an ethylene group.

The compounds represented by the formula (A1) and the compounds represented by the formula (A2) in the present invention can be produced according to the method shown by the following reaction formula-1, reaction formula-2, reaction formula-3, reaction formula-4, reaction formula-5 or reaction formula-6.

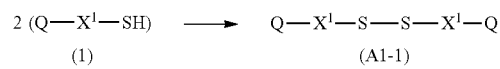

Reaction Formula 1

[In the reaction formula, Q and $X^1$ are the same as Q and $X^1$ in the compounds represented by the above-mentioned formula (A1).]

According to the reaction formula-1, two molecules of a thiol compound represented by the formula (1) are oxidatively bonded in a solvent to produce a compound represented by the formula (A1-1).

The solvent to be used in the reaction of the reaction formula-1 widely includes any and every solvent inert to the reaction, for which, for example, there are mentioned water; aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; ester solvents such as methyl acetate, ethyl acetate, etc.; ketone solvents such as acetone, methyl ethyl ketone, etc.; amide solvents such as N,N-dimethylformamide, etc.; nitrile solvents such as acetonitrile, propionitrile, etc.; aprotic polar solvents such as dimethyl sulfoxide, N-methylpyrrolidone, N,N'-dimethylimidazolinone, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the thiol compound represented by the formula (1).

The oxidizing agent to be used in the reaction of the reaction formula-1 includes hydrogen peroxide, iodine, bromine, potassium permanganate, copper sulfate, lead dioxide, $Fe^{3+}$ complex; nitrogen oxides such as NO, $N_2O_4$, $NO_2$, etc.; dimethyl sulfoxide, diaryl selenoxide, 2-polyvinylpyridine-bromine 1/1 adduct, metal complex of bipyridine and Cu(II) or Cr(II), etc. The compound may also be produced through phase transfer reaction using bis[benzyltriethylammonium] dichromate, or tetrabutylammonium chromate.

The oxidizing agent may be used generally in an amount of from 0.1 to 100 equivalents, preferably from 0.5 to 5 equivalents, more preferably from 1 to 1.5 equivalents per the thiol compound represented by the formula (1).

The reaction of the reaction formula-1 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

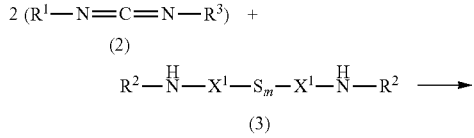

Reaction Formula 2

-continued

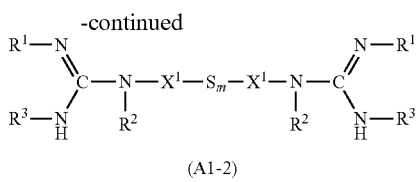

(A1-2)

[In the formula, $R^1$, $R^2$, $R^3$, $X^1$ and m are the same as mentioned above.]

According to the reaction formula-2, a carbodiimide compound represented by the formula (2) and a diamine compound represented by the formula (3) or a salt thereof are condensed in a solvent and in the presence or absence of a base to produce a compound represented by the formula (A1-2).

The solvent for use in the reaction of the reaction formula-2 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; ester solvents such as methyl acetate, ethyl acetate, etc.; ketone solvents such as acetone, methyl ethyl ketone, etc.; amide solvents such as N,N-dimethylformamide, etc.; nitrile solvents such as acetonitrile, propionitrile, etc.; aprotic polar solvents such as dimethyl sulfoxide, N-methylpyrrolidone, N,N'-dimethylimidazolinone, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the carbodiimide compound represented by the formula (2).

In the reaction of the reaction formula-2, the salt of the diamine compound represented by the formula (3) includes mineral acid salts with hydrochloric acid, sulfuric acid, nitric acid etc., and organic acid salts with tartaric acid, fumaric acid, malic acid, etc.

The diamine compound or its salt may be reacted in the presence of a base and in an amount of generally from 0.1 to 100 equivalents, preferably from 0.5 to 5 equivalents, more preferably from 1 to 1.5 equivalents per the carbodiimide compound represented by the formula (2).

The base for use in the reaction of the reaction formula-2 includes organic bases such as pyridine, triethylamine, N,N-dimethyl-4-aminopyridine, etc.; and inorganic bases such as sodium carbonate, potassium carbonate, sodium hydrogencarbonate, potassium hydrogencarbonate, etc. The base may be used generally in an amount of from 0.1 to 100 equivalents, preferably from 0.5 to 5 equivalents, more preferably from 1 to 1.5 equivalents per the diamine represented by the formula (3) or its salt.

The reaction of the reaction formula-2 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

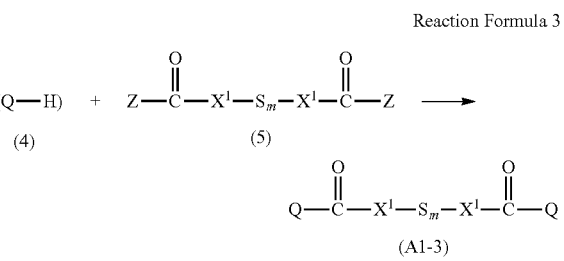

Reaction Formula 3

(A1-3)

[In the formula, Q, $X^1$ and m are the same as mentioned above. Z represents a chlorine atom, a bromine atom or an iodine atom.]

According to the reaction formula-3, an amine compound represented by the formula (4) or a salt thereof and a di-acid halide represented by the formula (5) are condensed in a solvent and in the presence or absence of a base to produce a compound represented by the formula (A1-3).

The solvent for use in the reaction of the reaction formula-3 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; ester solvents such as methyl acetate, ethyl acetate, etc.; ketone solvents such as acetone, methyl ethyl ketone, etc.; amide solvents such as N,N-dimethylformamide, etc.; nitrile solvents such as acetonitrile, propionitrile, etc.; aprotic polar solvents such as dimethyl sulfoxide, N-methylpyrrolidone, N,N'-dimethylimidazolinone, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the amine compound represented by the formula (4) or its salt.

In the reaction of the reaction formula-3, the salt of the amine compound represented by the formula (4) includes mineral acid salts with hydrochloric acid, sulfuric acid, nitric acid etc., and organic acid salts with tartaric acid, fumaric acid, malic acid, etc.

The diamine or its salt may be used generally in an amount of from 0.1 to 100 equivalents, preferably from 0.5 to 5 equivalents, more preferably from 1 to 2.5 equivalents per the di-acid halide represented by the formula (5).

In the reaction of the reaction formula-3 where Q in the amine compound represented by the formula (4) is a group represented by Q2, Q3 or Q4 and where the substituent $R^3$ or $R^4$ for the group is a hydrogen atom, the nitrogen atom to which the hydrogen atom bonds may be protected with a protective group, for example, an alkoxycarbonyl group such as a tert-butoxycarbonyl group, a benzyloxycarbonyl group, etc., an acyl group such as an acetyl group, a pivaloyl group, etc., or an alkoxyalkyl group such as a methoxymethyl group, an ethoxymethyl group, etc. Any ordinary method may apply to the method of protection with the protective group or deprotection therefrom.

The base for use in the reaction of the reaction formula-3 includes organic bases such as pyridine, triethylamine, N,N-dimethyl-4-aminopyridine, etc.; and inorganic bases such as sodium carbonate, potassium carbonate, sodium hydrogencarbonate, potassium hydrogencarbonate, etc. The base may be used generally in an amount of from 0.1 to 100 equivalents, preferably from 0.5 to 5 equivalents, more preferably from 1 to 1.5 equivalents per the amine represented by the formula (4) or its salt.

The reaction of the reaction formula-3 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

Reaction Formula 4

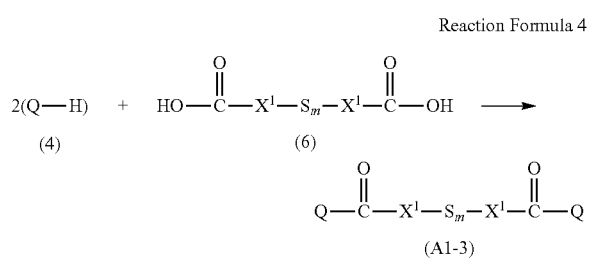

[In the formula, Q, $X^1$ and m are the same as mentioned above.]

According to the reaction formula-4, an amine compound represented by the formula (4) or a salt thereof and a dicarboxylic acid compound represented by the formula (6) are condensed in a solvent and in the presence or absence of a base using a condensing agent to produce a compound represented by the formula (A1-3).

The solvent for use in the reaction of the reaction formula-4 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; ester solvents such as methyl acetate, ethyl acetate, etc.; ketone solvents such as acetone, methyl ethyl ketone, etc.; amide solvents such as N,N-dimethylformamide, etc.; nitrile solvents such as acetonitrile, propionitrile, etc.; aprotic polar solvents such as dimethyl sulfoxide, N-methylpyrrolidone, N,N'-dimethylimidazolinone, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the amine compound represented by the formula (4) or its salt.

In the reaction of the reaction formula-4, the salt of the amine compound represented by the formula (4) includes mineral acid salts with hydrochloric acid, sulfuric acid, nitric acid etc.

The diamine or its salt may be used generally in an amount of from 0.1 to 100 equivalents, preferably from 0.5 to 5 equivalents, more preferably from 1 to 2.5 equivalents per the dicarboxylic acid compound represented by the formula (6).

In the reaction of the reaction formula-4 where Q in the amine compound represented by the formula (4) is a group represented by Q2, Q3 or Q4 that is the same as in the compound represented by the above-mentioned formula (A1) and where the substituent $R^3$ or $R^4$ for the group is a hydrogen atom, the nitrogen atom to which the hydrogen atom bonds may be protected with a protective group, for example, an alkoxycarbonyl group such as a tert-butoxycarbonyl group, a benzyloxycarbonyl group, etc., an acyl group such as an acetyl group, a pivaloyl group, etc., or an alkoxyalkyl group such as a methoxymethyl group, an ethoxymethyl group, etc. Any ordinary method may apply to the method of protection with the protective group or deprotection therefrom.

The condensing agent for use in the reaction of the reaction formula-4 includes carbodiimide compounds such as dicyclohexylcarbodiimide, ethyldimethylaminopropylcarbodiimide hydrochloride, etc., and carbodiimidazole, etc. The condensing agent may be used generally in an amount of from 0.1 to 100 equivalents, preferably from 0.5 to 5 equivalents, more preferably from 2 to 2.5 equivalents per the dicarboxylic acid represented by the formula (6).

The base for use in the reaction of the reaction formula-4 includes organic bases such as pyridine, triethylamine, N,N-dimethyl-4-aminopyridine, etc.; and inorganic bases such as sodium carbonate, potassium carbonate, sodium hydrogencarbonate, potassium hydrogencarbonate, etc. The base may be used generally in an amount of from 0.1 to 100 equivalents, preferably from 0.5 to 5 equivalents, more preferably from 1 to 1.5 equivalents per the amine represented by the formula (4) or its salt.

The reaction of the reaction formula-4 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

Reaction Formula-5

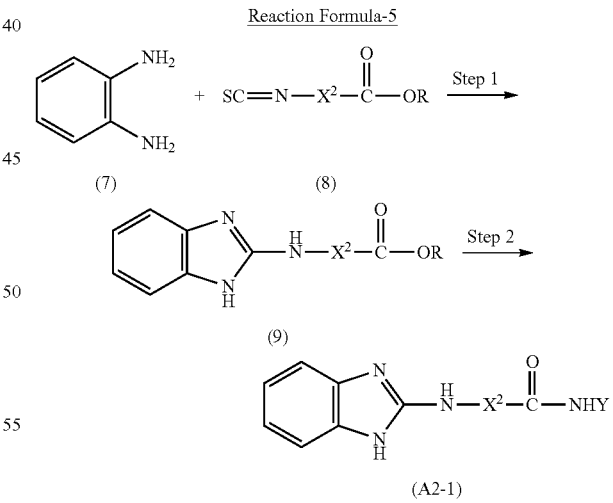

[In the formula, $X^2$ and Y are the same as mentioned above. R represents an alkyl group having from 1 to 4 carbon atoms.]

According to the reaction formula-5, phenylenediamine represented by the formula (7) or a salt thereof and an isothiocyanatocarboxylate ester compound represented by the formula (8) are condensed in a solvent and in the presence or absence of a base using a condensing agent (step 1) to produce an ester compound represented by the formula (9), and then the resultant ester compound represented by the formula (9) is reacted with a hydrazine compound in or not in a solvent and in the presence or absence of a base to produce a compound represented by the formula (A2-1).

The solvent for use in the step 1 of the reaction formula-5 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; ester solvents such as methyl acetate, ethyl acetate, etc.; ketone solvents such as acetone, methyl ethyl ketone, etc.; amide solvents such as N,N-dimethylformamide, etc.; nitrile solvents such as acetonitrile, propionitrile, etc.; aprotic polar solvents such as dimethyl sulfoxide, N-methylpyrrolidone, N,N'-dimethylimidazolinone, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the isothiocyanatocarboxylate ester compound represented by the formula (8).

In the step 1 of the reaction formula-5, the salt of the phenylenediamine represented by the formula (7) includes mineral acid salts with hydrochloric acid, sulfuric acid, nitric acid etc.

The phenylenediamine or its salt may be used generally in an amount of from 0.1 to 100 equivalents, preferably from 0.5 to 5 equivalents, more preferably from 1 to 2.5 equivalents per the isothiocyanatocarboxylate ester compound represented by the formula (8).

The condensing agent for use in the step 1 of the reaction formula-5 includes carbodiimide compounds such as dicyclohexylcarbodiimide, ethyldimethylaminopropylcarbodiimide hydrochloride, etc., and carbodiimidazole, etc. The condensing agent may be used generally in an amount of from 0.1 to 100 equivalents, preferably from 0.5 to 5 equivalents, more preferably from 2 to 2.5 equivalents per the isothiocyanatocarboxylate ester compound represented by the formula (8).

The base for use in the step 1 of the reaction formula-5 includes organic bases such as pyridine, triethylamine, N,N-dimethyl-4-aminopyridine, etc.; and inorganic bases such as sodium carbonate, potassium carbonate, sodium hydrogencarbonate, potassium hydrogencarbonate, etc. The base may be used generally in an amount of from 0.1 to 100 equivalents, preferably from 0.5 to 5 equivalents, more preferably from 1 to 1.5 equivalents per the phenylenediamine represented by the formula (7) or its salt.

The reaction for the step 1 of the reaction formula-5 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

The solvent for use in the step 2 of the reaction formula-5 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; aprotic polar solvents such as N,N'-dimethylimidazolinone, etc.; alcohols such as methanol, ethanol, isopropyl alcohol, 1-butanol, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the ester compound represented by the formula (9).

The hydrazine compound for use in the step 2 of the reaction formula-5 includes hydrazine as well as mono-substituted or 1,1-di-substituted hydrazines such as methylhydrazine, ethylhydrazine, n-propylhydrazine, isopropylhydrazine, tert-butylhydrazine, phenylhydrazine, 1,1-dimethylhydrazine, 1-methyl-1-(1-methylethyl)hydrazine, etc., and also includes hydrochlorides, sulfates and nitrates of those hydrazines.

The hydrazine compound may be used in an amount of generally from 0.1 to 100 equivalents, preferably from 0.5 to 5 equivalents, more preferably from 1 to 2.5 equivalents per the ester compound represented by the formula (9).

The base for use in the step 2 of the reaction formula-5 includes organic bases such as pyridine, triethylamine, N,N-dimethyl-4-aminopyridine, etc.; and inorganic bases such as sodium carbonate, potassium carbonate, sodium hydrogen carbonate, potassium hydrogen carbonate, etc.

The base may be used generally in an amount of from 0.1 to 100 equivalents, preferably from 0.5 to 5 equivalents, more preferably from 1 to 1.5 equivalents per the hydrazine compound.

The reaction for the step 2 of the reaction formula-5 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

The step 2 of the reaction formula-5 also includes a step of reacting the hydrazide compound represented by the formula (A2-1) (Y=NH$_2$), which is obtained through reaction of the ester compound represented by the formula (9) and hydrazine (in the reaction, preferred is use of hydrazine hydrate), with an aldehyde compound or a ketone compound.

The aldehyde compound or the ketone compound includes, for example, a straight-chain or branched-chain C1-6 alkylaldehyde such as formaldehyde, acetaldehyde, propanal, butanal, pentanal (valeraldehyde), hexanal (capronaldehyde), heptanal, etc.; an arylaldehyde compound such as benzaldehyde, etc.; a straight-chain or branched-chain C1-6 alkyl ketone compound such as acetone, methyl ethyl ketone, diethyl ketone, methyl n-propyl ketone, methyl isobutyl ketone, etc.; a cyclic C3-8 alkyl ketone compound such as cyclopropanone, cyclobutanone, cyclopentanone, cyclohexanone, cycloheptanone, cyclooctanone, etc.; an aryl ketone compound such as acetophenone, benzophenone, etc.

The aldehyde compound or the ketone compound may be used generally in an amount of from 0.1 to 100 equivalents, preferably from 0.5 to 5 equivalents, more preferably from 1 to 1.1 equivalents per the hydrazide compound represented by the formula (A2-1) (Y=NH$_2$).

The solvent for use in the step 2 of the reaction formula-5 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; aprotic polar solvents such as N,N'-dimethylimidazolinone, etc.; alcohols such as methanol, ethanol, isopropyl alcohol, 1-butanol, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the hydrazide compound.

This reaction may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

Reaction Formula-6

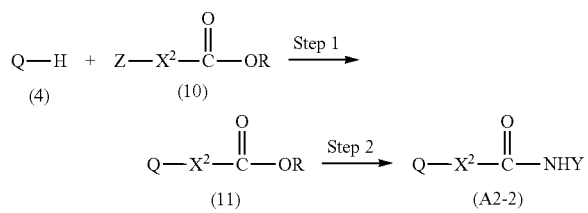

[In the formula, Q, R, $X^2$, Y and Z are the same as mentioned above.]

According to the reaction formula-6, an amine compound represented by the formula (4) or a salt thereof and a halocarboxylate ester compound represented by the formula (10) are condensed in a solvent and in the presence or absence of a base to produce an ester compound represented by the formula (11) (step 1), and then the resultant ester compound represented by the formula (11) is reacted with a hydrazine compound in or not in a solvent and in the presence or absence of a base to produce a compound represented by the formula (A2-2) (step 2).

The compound represented by the formula (A2-2) may also be produced through condensation of a hydrazide compound, which is obtained by reacting the ester compound represented by the formula (11) and a hydrazine hydrate, with an aldehyde or ketone compound in or not in a solvent.

The solvent for use in the step 1 of the reaction formula-6 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; ester solvents such as methyl acetate, ethyl acetate, etc.; ketone solvents such as acetone, methyl ethyl ketone, etc.; amide solvents such as N,N-dimethylformamide, etc.; nitrile solvents such as acetonitrile, propionitrile, etc.; aprotic polar solvents such as dimethyl sulfoxide, N-methylpyrrolidone, N,N'-dimethylimidazolinone, etc.; alcohols such as methanol, ethanol, isopropyl alcohol, 1-butanol, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the amine compound represented by the formula (4).

In the step 1 of the reaction formula-6, the salt of the amine compound represented by the formula (4) includes mineral acid salts with hydrochloric acid, sulfuric acid, nitric acid etc., or organic acid salts with tartaric acid, fumaric acid, malic acid, etc.

The amine compound represented by the formula (4) or its salt may be used generally in an amount of from 0.1 to 100 equivalents, preferably from 0.5 to equivalents, more preferably from 0.9 to 1.1 equivalents per the 2-halocarboxylate ester compound represented by the formula (10).

In the reaction of the reaction formula-6 where Q in the amine compound represented by the formula (4) is a group represented by Q2, Q3 or Q4 and where the substituent $R^3$ or $R^4$ for the group is a hydrogen atom, the nitrogen atom to which the hydrogen atom bonds may be protected with a protective group, for example, an alkoxycarbonyl group such as a tert-butoxycarbonyl group, a benzyloxycarbonyl group, etc., an acyl group such as an acetyl group, a pivaloyl group, etc., or an alkoxyalkyl group such as a methoxymethyl group, an ethoxymethyl group, etc. Any ordinary method may apply to the method of protection with the protective group or deprotection therefrom.

The base for use in the step 1 of the reaction formula-6 includes organic bases such as pyridine, triethylamine, N,N-dimethyl-4-aminopyridine, etc.; and inorganic bases such as sodium carbonate, potassium carbonate, sodium hydrogen carbonate, potassium hydrogen carbonate, etc.

The base may be used generally in an amount of from 0.1 to 100 equivalents, preferably from 0.5 to 5 equivalents, more preferably from 1 to 1.5 equivalents per the amine compound represented by the formula (4) or its salt.

The reaction for the step 1 of the reaction formula-6 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

The step 2 of the reaction formula-6 also includes a step of using the hydrazide compound represented by the formula (A2-2) where Y=$NH_2$, which is obtained through reaction of the ester compound represented by the formula (11) and a hydrazine (in the reaction, preferred is use of hydrazine hydrate), as an intermediate in production, and reacting the hydrazine compound with an aldehyde compound or a ketone compound to produce the final hydrazide compound represented by the formula (A2-2).

The aldehyde compound or the ketone compound includes, for example, a straight-chain or branched-chain C1-6 alkylaldehyde such as formaldehyde, acetaldehyde, propanal, butanal, pentanal (valeraldehyde), hexanal (capronaldehyde), heptanal, etc.; an arylaldehyde compound such as benzaldehyde, etc.; a straight-chain or branched-chain C1-6 alkyl ketone compound such as acetone, methyl ethyl ketone, diethyl ketone, methyl n-propyl ketone, methyl isobutyl ketone, etc.; a cyclic C3-8 alkyl ketone compound such as cyclopropanone, cyclobutanone, cyclopentanone, cyclohexanone, cycloheptanone, cyclooctanone, etc.; an aryl ketone compound such as acetophenone, benzophenone, etc.

The aldehyde compound or the ketone compound may be used generally in an amount of from 0.1 to 100 equivalents, preferably from 0.5 to 5 equivalents, more preferably from 1 to 1.1 equivalents per the hydrazide compound represented by the formula (A2-2) with Y=NH$_2$ which is an intermediate in production.

The solvent for use in the step 2 of the reaction formula-6 widely includes any and every solvent inert to the reaction, for which, for example, there are mentioned aliphatic or alicyclic hydrocarbon solvents such as hexane, cyclohexane, heptane, etc.; aromatic hydrocarbon solvents such as benzene, chlorobenzene, toluene, xylene, etc.; halogenohydrocarbon solvents such as methylene dichloride, 1,2-dichloroethane, chloroform, carbon tetrachloride, etc.; ether solvents such as diethyl ether, tetrahydrofuran, 1,4-dioxane, etc.; aprotic polar solvents such as N,N'-dimethylimidazolinone, etc.; alcohols such as methanol, ethanol, isopropyl alcohol, 1-butanol, etc. One alone of these solvents may be used, and if desired, two or more of them may be used as combined.

The solvent may be used in an amount of generally from 1 to 500 parts by weight or so, preferably from 5 to 100 parts by weight or so, per 1 part by weight of the hydrazide compound.

The reaction of the reaction formula-6 may be carried out generally in a range of from −78° C. to the boiling point of the solvent used, but is generally within a range of from −10 to 50° C. or so, preferably at around room temperature.

The reaction time could not be defined indiscriminately as varying depending on the reaction temperature and others, but in general, the reaction may finish in 0.5 to 24 hours or so.

The compound represented by the formula (A1) or (A2) that is produced according to any of the above-mentioned reactions may be readily isolated from the reaction mixture according to an ordinary isolation method, for example, an organic solvent extraction method, a chromatography method, a recrystallization method or the like, and may be further purified according to an ordinary purification method.

The compound A for use in the present invention is preferably at least one selected from N,N'-di-(1H-benzimidazol-2-yl)-2,2'-disulfanediylethanamine, N,N'-di-(1H-benzimidazol-2-yl)-3,3'-disulfanediylpropanamide, bis[3-(2-amino-1H-benzimidazol-1-yl)-3-oxopropyl]disulfane, bis[6-(2-amino-1H-benzimidazol-1-yl)-6-oxohexyl]disulfane, bis[2-(2,3-diphenylguanidino)ethyl]disulfane, 2-[(1H-benzimidazol-2-yl)amino]acetohydrazide, 2-(2-amino-1H-benzimidazol-1-yl)acetohydrazide, bis[2-(2-amino-1H-benzimidazol-1-yl)ethyl]disulfane, bis[2-(2-dimethylamino-1H-benzimidazol-1-yl)ethyl]disulfane, N,N'-di-(1H-benzimidazol-2-yl)-N,N'-dimethyl-2,2'-disulfanediyldiethanamine, and N,N'-di-(1H-benzimidazol-2-yl)-2,2'-[disulfanediylbis(ethyleneoxy)]diethanamine.

Further, the compound A in the present invention is preferably at least one selected from N,N'-di(1H-benzimidazol-2-yl)-2,2'-disulfandiylethanamine, N,N'-di-(1H-benzimidazol-2-yl)-3,3'-disulfanediyldipropanamide, bis[3-(2-amino-1H-benzimidazol-1-yl)-3-oxopropyl]disulfane, bis[6-(2-amino-1H-benzimidazol-1-yl)-6-oxohexyl]disulfane, bis[2-(2,3-diphenylguanidino)ethyl]disulfane, 2-[(1H-benzimidazol-2-yl)amino]acetohydrazide and 2-(2-amino-1H-benzimidazol-1-yl)acetohydrazide.

Here, N,N'-di-(1H-benzimidazol-2-yl)-2,2'-disulfanediylethanamine is a compound a represented by the following formula (IV).

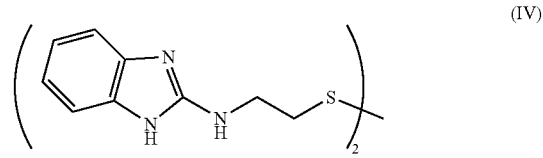

N,N'-di-(1H-benzimidazol-2-yl)-3,3'-disulfanediyldipropanamide is a compound b represented by the following formula (V).

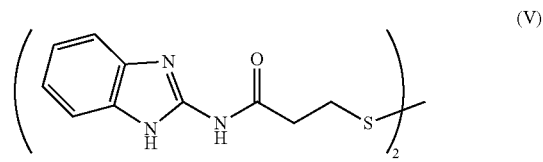

Bis[3-(2-amino-1H-benzimidazol-1-yl)-3-oxopropyl]disulfane is a compound c represented by the following formula (VI).

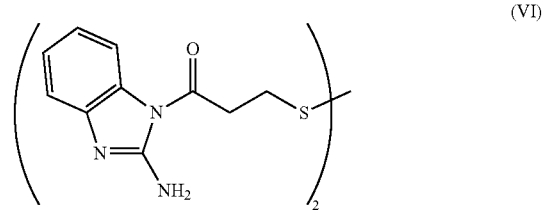

Bis[6-(2-amino-1H-benzimidazol-1-yl)-6-oxohexyl]disulfane is a compound d represented by the following formula (VII).

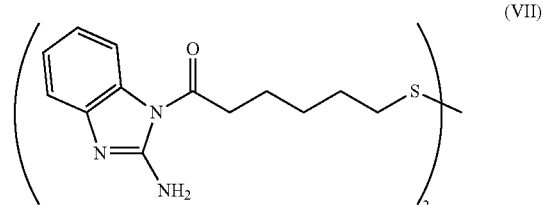

Bis[2-(2,3-diphenylguanidino)ethyl]disulfane is a compound e represented by the following formula (VIII).

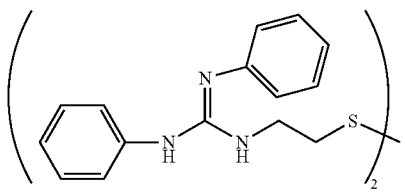

2-[(1H-benzimidazol-2-yl)amino]acetohydrazide is a compound f represented by the following formula (IX).

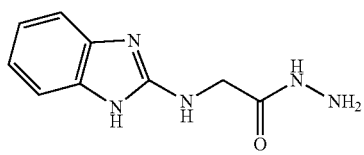

2-(2-Amino-1H-benzimidazol-1-yl)acetohydrazide is a compound g represented by the following formula (X).

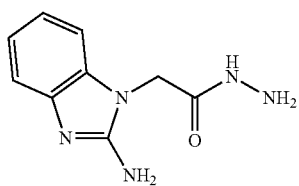

Bis[2-(2-amino-1H-benzimidazol-1-yl)ethyl]disulfane is a compound h represented by the following formula (XI).

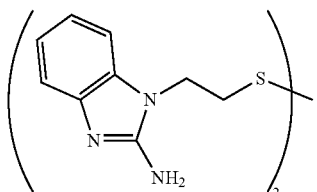

Bis[2-(2-dimethylamino-1H-benzimidazol-1-yl)ethyl]disulfane is a compound i represented by the following formula (XII).

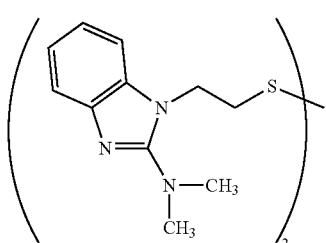

N,N'-di-(1H-benzimidazol-2-yl)-N,N'-dimethyl-2,2'-disulfanediyldiethanamine is a compound j represented by the following formula (XIII).

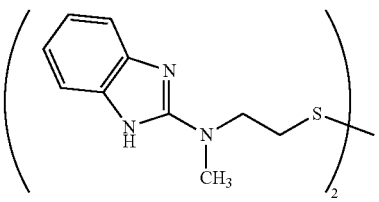

N,N'-di-(1H-benzimidazol-2-yl)-2,2'-[disulfanediylbis(ethyleneoxy)]diethanamine is a compound k represented by the following formula (XIV).

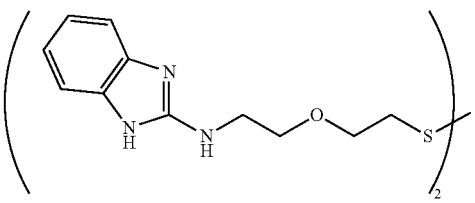

The rubber composition of the present invention is prepared by mixing from 0.05 to 30 parts by mass, preferably from 0.1 to 30 parts by mass, more preferably from 0.1 to 20 parts by mass, even more preferably from 0.1 to 10 parts by mass, still more preferably from 0.1 to 5 parts by mass of the compound A, per 100 parts by mass of the rubber component therein.

[Filler]

The filler to be incorporated in the rubber composition of the present invention is preferably carbon black, but may be a combination of carbon black and an inorganic filler.

The rubber composition of the present invention is prepared by mixing from 20 to 150 parts by mass of a filler per 100 parts by mass of the rubber component therein. Preferably, as the filler component therein, the rubber composition is prepared by mixing from 20 to 150 parts by mass of carbon black and from 0 to 130 parts by mass of an inorganic filler, per 100 parts by mass of the rubber component therein. More preferably, the filler component to be incorporated contains from 20 to 149 parts by mass of carbon black and from 1 to 130 parts by mass of an inorganic filler, even more preferably from 20 to 148 parts by mass of carbon black and from 2 to 130 parts by mass of an inorganic filler, still more preferably from 20 to 145 parts by mass of carbon black and from 5 to 130 parts by mass of an inorganic filler.

Incorporation of carbon black alone increases a tougher reinforcing layer of carbon black and is therefore preferred from the viewpoint of improving the abrasion resistance and the fracture resistance of the composition. Combined incorporation of carbon black and an inorganic filler increases the reinforcing layer of not only carbon black but also the inorganic filler, and is therefore preferred from the viewpoint of improving the balance between the wet performance and the abrasion resistance and the fracture resistance of the composition.

[Carbon Black]

Carbon black serving as the filler in the rubber composition of the present invention is not specifically defined, but is preferably a high-, middle- or low-structure SAF, ISAF, IISAF, N339, HAF, FEF, GPF or SRF-grade carbon black, especially SAF, ISAF, IISAF, N339, HAF or FEF-grade carbon black. Also preferably, the carbon black has a nitrogen adsorption specific surface area ($N_2$SA, measured according to JIS K 6217-2:2001) of from 30 to 250 m$^2$/g. One alone or two or more different types of such carbon blacks may be used here either singly or as combined.

(Inorganic Filler)

As the inorganic filler usable in the rubber composition of the present invention, preferred is silica. As the silica, any and every commercially-available one is usable here. Above all, preferred is use of wet method silica, dry method silica or colloidal silica, and more preferred is use of wet method silica. The BET specific surface area of the silica (as measured according to ISO 5794/1) is preferably from 40 to 350 m$^2$/g. The silica having a BET specific surface area falling within the range is advantageous in that it satisfies both rubber-reinforcing performance and dispersibility in the rubber component. From this viewpoint, more preferred is silica having a BET specific surface falling within a range of from 80 to 350 m$^2$/g, and even more preferred is silica having a BET specific surface falling within a range of from 120 to 350 m$^2$/g. As the silica of the type, usable here are commercial products such as "Nipsil AQ" (BET specific surface area=205 m$^2$/g) and "Nipsil KQ", both trade names of Tosoh Silica Corporation and "Ultrasil VN3" (BET specific surface area=175 m$^2$/g), a trade name of Degussa GmBH, etc.

Incorporating silica into the rubber composition of the present invention improves the wet performance of tires while maintaining the high elastic modulus and the low heat-generation-property thereof.

As the inorganic filler for use in the rubber composition of the present invention one or more inorganic compounds represented by the following general formula (XV) may be used alone or as combined with silica.

Here in the general formula (XV), M$^1$ represents at least one of a metal selected from a group consisting of aluminium, magnesium, titanium, calcium and zirconium, oxides or hydroxides of these metals, hydrates thereof, and carbonates of these metals; d, x, y and z indicate an integer of from 1 to 5, an integer of from 0 to 10, an integer of from 2 to 5, or an integer of from 0 to 10, respectively.

In the case where x and z are both 0 in the general formula (XV), the inorganic compound is at least one metal selected from aluminium, magnesium, titanium, calcium and zirconium, a metal oxide thereof or a metal hydroxide thereof.

As the inorganic compound represented by the above-mentioned general formula (XV), usable here are alumina ($Al_2O_3$) such as γ-alumina, α-alumina, etc.; alumina hydrate ($Al_2O_3.H_2O$) such as boehmite, diaspore, etc.; aluminium hydroxide [$Al(OH)_3$] such as gibbsite, bialite, etc.; aluminium carbonate [$Al_2(CO_3)_2$], magnesium hydroxide [$Mg(OH)_2$], magnesium oxide (MgO), magnesium carbonate ($MgCO_3$), talc, ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminium magnesium oxide ($MgO.Al_2O_3$), clay ($Al_2O_3.2SiO_2$), kaolin ($Al_2O_3.2SiO_2.2H_2O$), pyrophillite ($Al_2O_3.4SiO_2.H_2O$), bentonite ($Al_2O_3.4SiO_2.2H_2O$), aluminium silicate ($Al_2SiO_5$, $Al_4.3SiO_4.5H_2O$, etc.), magnesium silicate ($Mg_2SiO_4$, $MgSiO_3$, etc.), calcium silicate ($Ca_2.SiO_4$, etc.), aluminium calcium silicate ($Al_2O_3.CaO.2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicates containing hydrogen, alkali metal or alkaline earth metal for charge correction such as various types of zeolites. Preferred are those of the above-mentioned general formula (XV) where M$^1$ is at least one selected from aluminium metal, aluminium oxide or hydroxide, hydrates thereof, and aluminium carbonate.

The mean particle size of the inorganic compound represented by the above-mentioned general formula (XV) is preferably within a range of from 0.01 to 10 μm, more preferably from 0.05 to 5 μm from the viewpoint of the balance of the kneading workability, the abrasion resistance and the wet grip performance.

In the case where an inorganic filler such as silica or the like is incorporated in the rubber composition of the present invention, preferably a silane coupling agent is incorporated therein from the viewpoint of increasing the reinforcing performance of the inorganic filler, and the incorporation of the agent further enhances the workability in rubber processing and gives tires having better abrasion resistance. Regarding the amount of the silane coupling agent to be incorporated, preferably, the ratio by mass of {silane coupling agent/inorganic filler} is from (1/100) to (20/100). When the ratio is (1/100) or more, then the low-heat-generation property of the rubber composition may be favorably more remarkable; and when the ratio is (20/100) or less, then the cost of the rubber composition may be reduced and the economic efficiency thereof may be increased. More preferably, the ratio by mass is from (3/100) to (20/100), even more preferably from (4/100) to (10/100).

The silane coupling agent for use in the rubber composition is not specifically defined but is preferably one or more compounds selected from the compounds shown below.

Specific examples of the silane coupling agent include alkoxyalkyl polysulfides such as bis(3-triethoxysilylpropyl) tetrasulfide, bis(3-trimethoxysilylpropyl) tetrasulfide, bis(3-methyldimethoxysilylpropyl)tetrasulfide, bis(2-triethoxysilylethyl) tetrasulfide, bis(3-triethoxysilylpropyl)disulfide, bis(3-trimethoxysilylpropyl) disulfide, bis(3-methyldimethoxysilylpropyl) disulfide, bis(2-triethoxysilylethyl) disulfide, bis(3-triethoxysilylpropyl) trisulfide, bis(3-trimethoxysilylpropyl) trisulfide, bis(3-methyldimethoxysilylpropyl) trisulfide, bis(2-triethoxysilylethyl) trisulfide, bis(3-monoethoxydimethylsilylpropyl) tetrasulfide, bis(3-monoethoxydimethylsilylpropyl) trisulfide, bis(3-monoethoxydimethylsilylpropyl) disulfide, bis(3-monomethoxydimethylsilylpropyl) tetrasulfide, bis(3-monomethoxydimethylsilylpropyl) trisulfide, bis(3-monomethoxydimethylsilylpropyl) disulfide, bis(2-monoethoxydimethylsilylethyl) tetrasulfide, bis(2-monoethoxydimethylsilylethyl) trisulfide, bis(2-monoethoxydimethylsilylethyl) disulfide, etc.; alkanoylthioalkyltrialkoxysilanes such as 3-hexanoylthiopropyltriethoxysilane, 3-octanoylthiopropyltriethoxysilane{manufactured by Momentive Performance Materials, trade name "NXT Silane" (registered trademark)}, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, etc.; Momentive Performance Materials' trade name "NXT Low-V Silane" (registered trademark); Momentive Performance Materials' trade name "NXT Ultra Low-V Silane" (registered trademark); Momentive Performance Materials' trade name "NXT Z" (registered trademark), etc.

The rubber component for use in the rubber composition of the present invention must contain a diene-based rubber in an amount of 50% by mass or more, and the diene-based rubber therein is preferably 100% by mass. Preferably, the diene-based rubber is at least one selected from a natural rubber and a synthetic diene-based rubber. With no limitation thereon, the synthetic diene-based rubber may be any rubber containing a diene-based monomer as at least a part of the monomer that constitutes the rubber. Concretely, usable diene-based rubbers are a styrene-butadiene copolymer rubber (SBR), a polybutadiene rubber (BR), a polyisoprene rubber (IR), an acrylonitrile-butadiene copolymer rubber (NBR), a butyl rubber (IIR), a halogenobutyl rubber (chlorobutyl rubber (Cl-IIR), bromobutyl rubber (Br-IIR), etc.}, an ethylene-propylene-diene tercopolymer rubber (EPDM), an ethylene-butadiene copolymer rubber (EBR), a propylene-butadiene copolymer rubber (PBR), etc. One alone or two or more of such natural rubber and synthetic diene-based rubber may be used here either singly or as combined.

The other rubber component than the diene-based rubber includes an ethylene-propylene copolymer rubber (EPM), an acryl rubber (ACM), a chloropolyethylene (CM), an epichlorohydrin rubber (CO, ECO), a chlorosulfonated polyethylene (CSM), etc.

In the rubber composition of the present invention, various compounding ingredients which are generally compounded in a rubber composition, for example, stearic acid, resin acid, a vulcanization activator such as zinc flower or the like, as well as an antiaging agent, a softener and the like may be incorporated, if desired, in the first stage or final stage of kneading, or in the intermediate stage between the first stage and the final stage. In addition, in the final stage of kneading, a vulcanization agent such as sulfur or the like, or a vulcanization accelerator or the like may be incorporated.

As the kneading apparatus to be employed in producing the rubber composition of the present invention, there are mentioned a Banbury mixer, a roll, an intensive mixer, a kneader, a biaxial extruder, etc.

EXAMPLES

The present invention is described in more detail with reference to Examples given below, but the present invention is not restricted at all to the following Examples.

Dynamic elastic modulus E' index and tan δ index were evaluated according to the method mentioned below.

Dynamic Elastic Modulus E' Index and Tan δ Index

Using a spectrometer (dynamic viscoelasticity measuring apparatus) manufactured by Ueshima Seisakusho Co., Ltd., each sample was analyzed at a frequency of 52 Hz, at an initial strain of 10%, at a temperature of 60° C. and at a dynamic strain of 1%. The found data of dynamic elastic modulus E' and tan δ of the sample were expressed as index indication according to the following formula, based on the numerical value of dynamic elastic modulus E' and tan δ of Comparative Example 1 or 2, each as referred to as 100. Regarding the dynamic elastic modulus E', the samples having a larger index value have a higher dynamic elastic modulus E'. On the other hand, regarding the tan δ index, the samples having a smaller index value have a better low-heat-generation property and have a smaller hysteresis loss.

Dynamic Elastic Modulus E' Index={(dynamic elastic modulus E' of vulcanized rubber composition tested)/(dynamic elastic modulus E' of vulcanized rubber composition in Comparative Example 1 or 2)}×100 tan δ Index={(tan δ of vulcanized rubber composition tested)/(tan δ of vulcanized rubber composition in Comparative Example 1 or 2)}×100

Production Example 1

80 mL of chloroform and 13.8 g of thionyl chloride were added to 10.3 g of 2-(2-hydroxyethylamino)benzimidazole, and heated under reflux for 6 hours. Through reduced-pressure distillation, obtained was 17.3 g of a chloroethyl form product. 60 mL of water and 8.7 g of thiourea were added to 15.1 g of the resultant chloroethyl form product, heated at 90° C. and reacted for 1 day. 30 mL of aqueous 3 N sodium hydroxide solution was added thereto and reacted for 30 minutes, and then cooled to room temperature. The insoluble matter was filtered away, and 50 mL of water and 1.0 g of 35% hydrogen peroxide water were added to the filtrate. The precipitate was deliquored and dried under reduced pressure to give 7.99 g of N,N'-di-(1H-benzimidazol-2-yl)-2,2'-disulfanediylethanamine, the compound a represented by the above-mentioned formula (IV).

Property: white solid

Melting Point: 240° C.

$^1$H-NMR (500 MHz, DMSO-$D_6$, δ ppm): 3.0 (t, 2H), 3.6 (t, 2H), 6.9 (m, 3H), 7.1 (d, 2H), 10.8 (br, 1H)

Production Example 2

In an argon atmosphere, 37.8 g of 1-tert-butoxycarbonyl-2-aminobenzimidazole and 160 ml of dewatered tetrahydrofuran were put into a reactor, and 0.4 g of 4-dimethylaminopyridine were added to the resultant suspension. After this was cooled to 0° C., 3,3'-dithiobis(propionyl chloride) 8 g/dewatered toluene 8 ml was gradually and dropwise added thereto, then restored to room temperature, and thereafter heated under reflux for 3 hours. The reaction liquid was concentrated to ½, then the starting compound, 1-tert-butoxycarbonyl-2-aminobenzimidazole was filtered away, and 150 ml of ethyl acetate was added to the filtrate. This was processed for liquid-liquid separation with 200 ml of water and 150 ml of saturated saline water, then dried with magnesium sulfate, filtered, and concentrated to give a yellow solid. One g/10 ml of tetrahydrofuran and 10 equivalents (relative to the crude matter as converted into the corresponding product) of tetrafluoroacetic acid were added to the resultant solid, and stirred at room temperature for 30 minutes. Water of the same amount as that of tetrahydrofuran was added, and an aqueous 6 M sodium hydroxide solution was dropwise added for neutralization. The precipitated solid was collected through filtration, washed with water and 2-propanol and dried under reduced pressure to give 5.27 g of N,N'-di-(1H-benzimidazol-2-yl)-3,3'-disulfanediyldipropanamide, the compound b represented by the above-mentioned formula (V).
Property: white solid
Melting Point: 233.3° C.
$^1$H-NMR (500 MHz, DMSO-D$_6$, δ ppm): 2.90 (t, 4H), 3.08 (t, 4H), 7.07-7.08 (m, 4H), 7.43-7.44 (m, 4H), 11.62 (brs, 2H), 12.03 (brs, 2H)

Production Example 3

13.3 g of 2-aminobenzimidazole and 100 ml of dewatered tetrahydrofuran were cooled with ice, then 6.17 g of 3,3'-dithiobispropionyl chloride (88.9% by mass) was gradually and dropwise added thereto, restored to room temperature, and stirred for 2 hours. 500 ml of water was dropwise added for crystallization, and the resultant crystal was collected through filtration, crushed and washed with 40 ml of acetone, the crystal was again collected through filtration and dried under reduced pressure at 40° C. to give 8.66 g of bis[3-(2-amino-1H-benzimidazol-1-yl)-3-oxopropyl]disulfane, the compound c represented by the above-mentioned formula (VI).
Property: white solid
Melting Point: 228° C.
$^1$H-NMR (500 MHz, DMSO-D$_6$, δ ppm): 3.2 (t, 4H), 3.6 (t, 4H), 7.0 (t, 2H), 7.2 (t, 2H), 7.2 (d, 2H), 7.4 (brs, 4H), 7.6 (d, 2H)

Production Example 4

In an argon atmosphere, a mixture of 5 g of 6,6'-dithiohexanoic acid, 5.0 g of 2-aminobenzimidazole, 7.8 g of 1-ethyl-3-(3-dimethylaminopropyl)carbodiimide hydrochloride, 415 mg of 4-dimethylaminopyridine and 50 ml of methylene dichloride were reacted under reflux for 3 hours. After this was cooled to room temperature, the precipitate was collected through filtration and washed. The precipitate was washed with 40 ml of 2-propanol added thereto, then collected through filtration, washed and dried under reduced pressure to give 7.0 g of bis[6-(2-amino-1H-benzimidazol-1-yl)-6-oxohexyl]disulfane, the compound d represented by the above-mentioned formula (VII).
Property: white solid
Melting Point: 139° C.
$^1$H-NMR (500 MHz, DMSO-D$_6$, δ ppm): 1.5 (dt, 4H), 1.7-1.8 (m, 8H), 2.7 (t, 4H), 3.1 (t, 4H), 7.0 (dd, 2H), 7.1-7.2 (m, 4H), 7.4 (s, 4H), 7.6 (d, 2H), 12.0 (s, 2H)

Production Example 5

0.45 g of triethylamine was added to a mixture of 0.5 g of cystamine di-hydrochloride and 5 ml of dewatered tetrahydrofuran, and stirred at room temperature. This was cooled with ice to be at 4° C., and then 0.86 g of diphenylcarbodiimide was dropwise added thereto little by little. After addition of diphenylcarbodiimide, this was heated up to room temperature and reacted for 2 hours. 10 ml of deionized water was added to the resultant reaction liquid, and stirred for 5 minutes. This was extracted twice through liquid-liquid separation with 10 ml of ethyl acetate to separate the organic layer. About 10 g of anhydrous sodium sulfate was added to the organic layer for dehydration. After filtration, the solvent was evaporated away, and the resultant residue was dried under reduced pressure at 40° C. to give 1.2 g of bis[2-(2,3-diphenylguadnidino)ethyl] disulfane, the compound e represented by the above-mentioned formula (VIII).
Property: white amorphous solid
Melting Point: 48 to 56° C.
$^1$H-NMR (300 MHz, CDCl$_3$, δ ppm): 2.9 (t, 4H), 3.6 (d, 4H), 4.5 (brs, 2H), 5.7 (brs, 2H), 7.0 (brm, 12H), 7.3 (dd, 8H)

Production Example 6

320 ml of dewatered tetrahydrofuran and 19.3 g of 1,2-phenylenediamine were added to 25 g of ethyl isothiocyanate. This was stirred at 60° C. for 6 hours, then 51.44 g of 1-ethyl-3-(3-dimethylaminopropyl)carbodiimide hydrochloride was added thereto and stirred at 70° C. for 16 hours. The reaction liquid was cooled with ice, then neutralized with an aqueous sodium hydrogen carbonate solution, processed for liquid-liquid separation with ethyl acetate, dewatered with sodium sulfate and then the solvent was evaporated away under reduced pressure. A solvent of hexane/ethyl acetate=2/3 was added to the residue for crystallization, then the resulting crystal was filtered out and dried overnight via a vacuum pump. 300 ml of ethanol and 10.9 g of 100% hydrazine hydrate were added to 15.9 g of the intermediate, and stirred at 50° C. for 6 hours. The crystal was collected through filtration, washed with ethanol, and dried overnight via a vacuum pump to give 5.4 g of 2-[(1H-benzimidazol-2-yl)amino]acetohydrazide, the compound f represented by the above-mentioned formula (IX).
Property: white solid
Melting Point: 253° C.
$^1$H-NMR (500 MHz, DMSO-D$_6$, δ ppm): 3.9 (brs, 2H), 4.2 (brs, 2H), 6.7 (brs, 1H), 6.9 (m, 2H), 7.1 (m, 2H), 9.1 (brs, 1H), 10.8 (brs, 1H)

Production Example 7

300 ml of ethanol was added to 28 g of 2-aminobenzimidazole, and 35.12 g of ethyl bromoacetate was dropwise added thereto at room temperature. This was stirred at 50° C. for 3 days, then the solvent was evaporated away under reduced pressure, 110 ml of acetone was added, and the crystal was filtered out. The filtrate was concentrated under reduced pressure, then 200 ml of methanol and 17 g of 100% hydrazine hydrate were added to the residue, stirred at 40° C., and the crystal was filtered out, washed with methanol, and dried overnight via a vacuum pump to give 8.96 g of 2-(2-amino-1H-benzimidazol-1-yl)acetohydrazide, the compound g represented by the above-mentioned formula (X).
Property: white solid
Melting Point: 252° C.
$^1$H-NMR (500 MHz, DMSO-D$_6$, δ ppm): 4.3 (brs, 2H), 4.6 (brs, 2H), 6.4 (brs, 2H), 6.8 (t, 1H), 6.9 (t, 1H), 7.0 (d, 1H), 7.1 (d, 1H), 9.4 (brs, 1H)

Production Example 8

80 ml of dewatered tetrahydrofuran and 8.2 ml of thionyl chloride were added to 10.0 g of 2-amino-1-hydroxyethylbenzimidazole, and heated under reflux for 14 hours. The solvent was evaporated away under reduced pressure to dryness, and 60 ml of water and 8.6 g of thiourea were added to the resultant chloroethyl form product, heated up to 90° C. and reacted for 62 hours. 60 ml of an aqueous 3 N sodium hydroxide solution was added, then reacted at 60° C. for 2.5 hours, and then cooled to room temperature. The insoluble matter was filtered away, and 2.7 g of 35% hydrogen peroxide water was added to the filtrate with cooling with ice. The precipitated matter was collected through filtration, and dried under reduced pressure to give 6.18 g of bis[2-(2-amino-1H-benzimidazol-1-yl)ethyl]disulfane, the compound h represented by the above-mentioned formula (XI).

Property: white solid

Melting Point: 233° C.

$^1$H-NMR (500 MHz, DMSO-D$_6$, δ ppm): 3.0 (t, 2H), 4.2 (t, 2H), 6.4 (s, 2H), 6.9 (dt, 2H), 7.1 (m, 2H)

Production Example 9

A mixture of 23.2 g of 2-dimethylaminobenzimidazole, 15.2 g (1.2 equivalents) of ethylene carbonate and 100 ml of dimethylformamide was stirred at 150° C. for about 15 hours until the system finished foaming. The resultant reaction liquid was restored to room temperature, then 300 ml of deionized water was added thereto and stirred for 5 minutes, and extracted twice with 100 ml of ethyl acetate. The resultant organic layers were combined and dewatered with 20 g of anhydrous sodium sulfate. The organic layer was filtered away, and the residue collected through concentration of the filtrate under reduced pressure was dried at 40° C. under reduced pressure to give 18.4 g of crystalline 1-(2-hydroxyethyl)-2-dimethylaminobenzimidazole.

A mixture of 18 g of the resultant 1-(2-hydroxyethyl)-2-dimethylaminobenzimidazole and 100 ml of chloroform was stirred at room temperature, then 12.5 g of thionyl chloride was dropwise added thereto, and heated under reflux with stirring for 1 hour. The resultant reaction liquid was concentrated under reduced pressure, then the resultant residue was dissolved in 200 ml of water, 40 g of thiourea was added and reacted at 80° C. for 20 hours. The reaction liquid was cooled, then dropwise added to 300 ml of an aqueous 10% sodium hydroxide solution, and stirred as such at room temperature for 16 hours. The reaction liquid was filtered, and 5 g of hydrogen peroxide was dropwise added to the filtrate. The precipitate was collected through filtration, and dried under reduced pressure to give 9.3 g of bis[2-(2-dimethylamino-1H-benzimidazol-1-yl)ethyl]disulfane, the compound i represented by the above-mentioned formula (XII).

Property: white crystal

Melting Point: 111° C.

$^1$H-NMR (300 MHz, DMSO-D$_6$, δ ppm): 2.9 (s, 12H), 3.1 (t, 4H), 4.3 (t, 4H), 7.1 (m, 4H), 7.3 (m, 4H)

Production Example 10

80 ml of chloroform and 6.8 ml of thionyl chloride were added to 9.0 g of 2-(N-methyl-2-hydroxyethylamino)benzimidazole, and heated under reflux for 2 hours. The solvent was evaporated away under reduced pressure to dryness, and 80 ml of water and 9.0 g of thiourea were added to the resultant chloroethyl form product, heated up to 90° C. and reacted for 63 hours. 80 ml of an aqueous 3 N sodium hydroxide solution was added, then reacted at 60° C. for 2 hours, and then cooled to room temperature. The insoluble matter was filtered away, and 2.3 g of 35% hydrogen peroxide water was added to the filtrate with cooling with ice. The precipitated matter was collected through filtration, and dried under reduced pressure to give 7.4 g of N,N'-di-(1H-benzimidazol-2-yl)-N,N'-dimethyl-2,2'-disulfanediyldiethanamine, the compound j represented by the above-mentioned formula (XIII).

Property: white solid

Melting Point: 112° C.

$^1$H-NMR (300 MHz, DMSO-D$_6$, δ ppm): 3.1 (t, 4H), 3.1 (s, 6H), 3.8 (t, 4H), 6.9 (s, 4H), 7.1 (m, 4H), 11.2 (brs, 2H)

Production Example 11

80 ml of chloroform and 6.6 ml of thionyl chloride were added to 10 g of 2-[2-(2-hydroxyethoxy)ethylamino]benzimidazole, and heated under reflux for 4 hours. The solvent was evaporated away under reduced pressure to dryness, and 80 ml of water and 6.9 g of thiourea were added to the resultant chloroethyl form product, heated up to 90° C. and reacted for 64 hours. 80 ml of an aqueous 3 N sodium hydroxide solution was added, then reacted at 60° C. for 1.5 hours, and then cooled to room temperature. The insoluble matter was filtered away, and 2.2 g of 35% hydrogen peroxide water was added to the filtrate with cooling with ice. This was extracted with chloroform, then the solvent was evaporated away under reduced pressure, and the residue was dried under reduced pressure at 40° C. to give 10.4 g of N,N'-di-(1H-benzimidazol-2-yl)-2,2'-[disulfanediylbis(ethyleneoxy)]diethanamine, the compound k represented by the above-mentioned formula (XIV).

Property: amorphous solid $^1$H-NMR (300 MHz, DMSO-D$_6$, δ ppm): 2.9 (t, 4H), 3.4 (dd, 4H), 3.6 (t, 4H), 3.7 (t, 4H), 6.5 (t, 2H), 6.8 (m, 4H), 7.1 (m, 4H), 10.7 (brs, 2H)

Production Example 12

13.2 g of methyl isobutyl ketone and 90 ml of methanol were added to 4.52 g of 2-[(1H-benzimidazol-2-yl)amino]acetohydrazide (compound f) produced in the above-mentioned Production Example 6, and stirred at 60° C. for 2.5 hours. The end of the reaction was confirmed through TLC, then the solvent was evaporated away under reduced pressure, the residue was crushed and washed with 50 ml of isopropyl ether, taken out through filtration, and dried overnight under reduced pressure at 40° C. to give 6.01 g of a compound represented by the following formula:

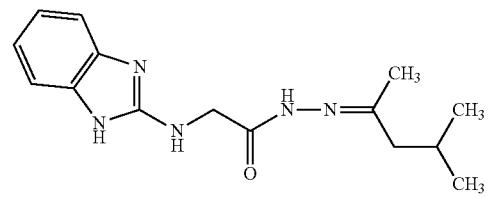

(XVI)

Property: white solid

Melting Point: 147° C.

$^1$H-NMR (500 MHz, DMSO-D$_6$, δ ppm): 0.7-1.0 (m, 6H), 1.8-2.3 (m, 6H), 4.0 (s, 0.8H), 4.3 (s, 1.2H), 6.5 (s, 0.6H), 6.9 (m, 2.4H), 7.1 (m, 2H), 10.3 (s, 0.6H), 10.5 (s, 0.4H), 10.8 (brs, 1H)

According to the method of any of the above-mentioned Production Examples, the compounds listed in the following Table 1 and Table 2 were produced.

TABLE 1

| Production Example | Compound | Property Melting Point (° C.) | $^1$H-NMR (300 MHz, DMSO-D$_6$, δ ppm) |
|---|---|---|---|
| 13 | (benzimidazole with N-CH$_2$CH$_2$-S- linker and 2-NHPh substituent)$_2$ | white solid 114 | 3.1 (t, 4H), 4.5 (t, 4H), 6.9 (t, 2H), 7.0 (m, 4H), 7.8 (d, 4H), 8.9 (s, 2H) |
| 14 | (benzimidazole with N-C(O)CH$_2$CH$_2$-S- linker and 2-NHPh substituent)$_2$ | white solid 114 | 3.2 (t, 4H), 3.6 (t, 4H), 7.1 (dt, 4H), 7.3 (s, 2H), 7.3 (t, 2H), 7.4 (t, 4H), 7.5 (dd, 4H), 7.8 (d, 4H), 10.2 (s, 2H) |
| 15 | (benzimidazole with N-CH$_2$CH$_2$-S- linker and 2-N(CH$_3$)Ph substituent)$_2$ | white solid 68 | 2.7 (t, 4H), 3.4 (s, 6H), 3.9 (t, 4H), 6.8 (d, 4H), 7.0 (t, 2H), 7.2 (m, 4H), 7.3 (t, 4H), 7.4 (m, 2H), 7.5 (m, 2H) |

TABLE 2

| Production Example | Compound | Property Melting Point (° C.) | $^1$H-NMR (300 MHz, DMSO-D$_6$, δ ppm) |
|---|---|---|---|
| 16 | (benzimidazole with N-C(O)CH$_2$CH$_2$-S- linker and 2-N(CH$_3$)Ph substituent)$_2$ | amorphous solid | 2.6 (t, 4H), 3.1 (t, 4H), 3.6 (s, 6H), 6.9 (d, 4H), 7.0 (t, 2H), 7.3~7.4 (m, 8H), 7.7 (d, 2H), 8.0 (d, 2H) |

TABLE 2-continued

| Production Example | Compound | Property Melting Point (° C.) | $^1$H-NMR (300 MHz, DMSO-D$_6$, δ ppm) |
|---|---|---|---|
| 17 | 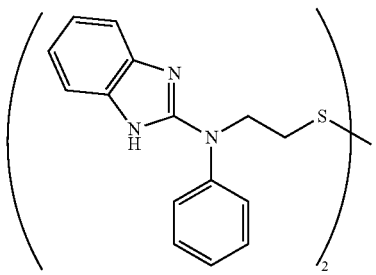 | white solid 268 | 3.1 (t, 4H), 4.2 (t, 4H), 6.9 (m, 4H), 7.1 (m, 2H), 7.3 (t, 4H), 7.4 (d, 4H), 7.5 (t, 4H), 11.0 (s, 2H) |
| 18 | 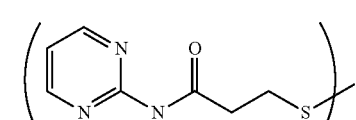 | pale yellow solid 183 | 2.9~3.0 (m, 8H), 7.16 (d, 2H), 8.7 (d, 4H), 10.6 (s, 2H) |
| 19 | 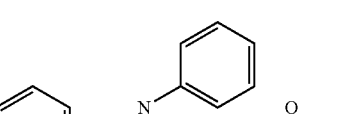 | white solid 174 | 2.3 (t, 2H), 3.3 (t, 2H), 4.2 (s, 2H), 5.6 (s, 1H), 6.8 (m, 2H), 7.0 (m, 4H), 7.1 (m, 2H), 9.2 (s, 1H) |

Examples 1 to 22, and Comparative Examples 1 and 2

According to the compounding formulation shown in Table 3 and Table 4, the components were kneaded in a Banbury mixer while the highest temperature of the rubber composition in the first stage of kneading could be 160° C. in every case, and in the final stage of kneading, an antiaging agent TMQ, zinc flower, a vulcanization accelerator TBBS and sulfur were added and further kneaded to prepare 24 types of rubber compositions. Subsequently, each rubber composition was vulcanized at a temperature of 145° C. The vulcanization time was, as defined to be $t_c$ (90) value (min)×1.5 times, {$t_c$ (90) value defined in JIS K 6300-2: 2001}. Thus obtained, 24 types of the vulcanized rubber compositions were analyzed according to the method mentioned above to determine the dynamic elastic modulus E' index and the tan δ index thereof. The results are shown in Table 3 and Table 4.

TABLE 3

| | | Example | | | | | | | | | | | Comparative Example |
|---|---|---|---|---|---|---|---|---|---|---|---|---|---|
| | | 1 | 2 | 3 | 4 | 5 | 6 | 7 | 8 | 9 | 10 | 11 | 1 |
| Compounding Formulation (part by mass) | Natural Rubber *1 | 100.0 | 100.0 | 100.0 | 100.0 | 100.0 | 100.0 | 100.0 | 100.0 | 100.0 | 100.0 | 100.0 | 100.0 |
| | Carbon Black N220 *2 | 50.0 | 50.0 | 50.0 | 50.0 | 50.0 | 50.0 | 50.0 | 50.0 | 50.0 | 50.0 | 50.0 | 50.0 |
| | Compound a *3 | 1.0 | — | — | — | — | — | — | — | — | — | — | — |
| | Compound b *4 | — | 1.0 | — | — | — | — | — | — | — | — | — | — |
| | Compound c *5 | — | — | 1.0 | — | — | — | — | — | — | — | — | — |
| | Compound d *6 | — | — | — | 1.0 | — | — | — | — | — | — | — | — |
| | Compound e *7 | — | — | — | — | 1.0 | — | — | — | — | — | — | — |
| | Compound f *8 | — | — | — | — | — | 1.0 | — | — | — | — | — | — |
| | Compound g *9 | — | — | — | — | — | — | 1.0 | — | — | — | — | — |
| | Compound h *10 | — | — | — | — | — | — | — | 1.0 | — | — | — | — |
| | Compound i *11 | — | — | — | — | — | — | — | — | 1.0 | — | — | — |
| | Compound j *12 | — | — | — | — | — | — | — | — | — | 1.0 | — | — |
| | Compound k *13 | — | — | — | — | — | — | — | — | — | — | 1.0 | — |
| | Compound l *14 | — | — | — | — | — | — | — | — | — | — | — | 1.0 |
| | Aromatic Oil *15 | 5.0 | 5.0 | 5.0 | 5.0 | 5.0 | 5.0 | 5.0 | 5.0 | 5.0 | 5.0 | 5.0 | 5.0 |
| | Stearic Acid | 2.0 | 2.0 | 2.0 | 2.0 | 2.0 | 2.0 | 2.0 | 2.0 | 2.0 | 2.0 | 2.0 | 2.0 |
| | Antiaging Agent 6PPD *16 | 1.0 | 1.0 | 1.0 | 1.0 | 1.0 | 1.0 | 1.0 | 1.0 | 1.0 | 1.0 | 1.0 | 1.0 |
| | Antiaging Agent TMQ *17 | 1.0 | 1.0 | 1.0 | 1.0 | 1.0 | 1.0 | 1.0 | 1.0 | 1.0 | 1.0 | 1.0 | 1.0 |
| | Zinc oxide | 2.5 | 2.5 | 2.5 | 2.5 | 2.5 | 2.5 | 2.5 | 2.5 | 2.5 | 2.5 | 2.5 | 2.5 |
| | Vulcanization Accelerator TBBS *18 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 |

TABLE 3-continued

|  |  | Example |  |  |  |  |  |  |  |  |  |  | Comparative Example |
|---|---|---|---|---|---|---|---|---|---|---|---|---|---|
|  |  | 1 | 2 | 3 | 4 | 5 | 6 | 7 | 8 | 9 | 10 | 11 | 1 |
| Properties of Vulcanized Rubber Composition | Dynamic Elastic Modulus E' Index | 115 | 113 | 107 | 120 | 110 | 105 | 105 | 117 | 115 | 116 | 115 | 100 |
|  | tanδ Index | 87 | 95 | 92 | 92 | 99 | 85 | 88 | 86 | 89 | 89 | 88 | 100 |
| Workability | Mooney Viscosity Index | 97 | 96 | 96 | 96 | 84 | 107 | 106 | 96 | 98 | 97 | 98 | 100 |
|  | Scorch Time Index | 82 | 106 | 104 | 104 | 62 | 91 | 95 | 84 | 90 | 88 | 83 | 100 |

TABLE 4

|  |  | Example |  |  |  |  |  |  |  |  |  |  | Comparative Example |
|---|---|---|---|---|---|---|---|---|---|---|---|---|---|
|  |  | 12 | 13 | 14 | 15 | 16 | 17 | 18 | 19 | 20 | 21 | 22 | 2 |
| Compounding Formulation (part by mass) | Natural Rubber *1 | 80.0 | 80.0 | 80.0 | 80.0 | 80.0 | 80.0 | 80.0 | 80.0 | 80.0 | 80.0 | 80.0 | 80.0 |
|  | Polybutadiene Rubber *19 | 20.0 | 20.0 | 20.0 | 20.0 | 20.0 | 20.0 | 20.0 | 20.0 | 20.0 | 20.0 | 20.0 | 20.0 |
|  | Carbon Black N220 *2 | 45.0 | 45.0 | 45.0 | 45.0 | 45.0 | 45.0 | 45.0 | 45.0 | 45.0 | 45.0 | 45.0 | 45.0 |
|  | Silica *20 | 10.0 | 10.0 | 10.0 | 10.0 | 10.0 | 10.0 | 10.0 | 10.0 | 10.0 | 10.0 | 10.0 | 10.0 |
|  | Silane Coupling Agent *21 | 1.0 | 1.0 | 1.0 | 1.0 | 1.0 | 1.0 | 1.0 | 1.0 | 1.0 | 1.0 | 1.0 | 1.0 |
|  | Compound a *3 | 1.0 | — | — | — | — | — | — | — | — | — | — | — |
|  | Compound b *4 | — | 1.0 | — | — | — | — | — | — | — | — | — | — |
|  | Compound c *5 | — | — | 1.0 | — | — | — | — | — | — | — | — | — |
|  | Compound d *6 | — | — | — | 1.0 | — | — | — | — | — | — | — | — |
|  | Compound e *7 | — | — | — | — | 1.0 | — | — | — | — | — | — | — |
|  | Compound f *8 | — | — | — | — | — | 1.0 | — | — | — | — | — | — |
|  | Compound g *9 | — | — | — | — | — | — | 1.0 | — | — | — | — | — |
|  | Compound h *10 | — | — | — | — | — | — | — | 1.0 | — | — | — | — |
|  | Compound i *11 | — | — | — | — | — | — | — | — | 1.0 | — | — | — |
|  | Compound j *12 | — | — | — | — | — | — | — | — | — | 1.0 | — | — |
|  | Compound k *13 | — | — | — | — | — | — | — | — | — | — | 1.0 | — |
|  | Compound l *14 | — | — | — | — | — | — | — | — | — | — | — | 1.0 |
|  | Aromatic Oil *15 | 6.0 | 6.0 | 6.0 | 6.0 | 6.0 | 6.0 | 6.0 | 6.0 | 6.0 | 6.0 | 6.0 | 6.0 |
|  | Stearic Acid | 2.0 | 2.0 | 2.0 | 2.0 | 2.0 | 2.0 | 2.0 | 2.0 | 2.0 | 2.0 | 2.0 | 2.0 |
|  | Antiaging Agent 6PPD *16 | 1.5 | 1.5 | 1.5 | 1.5 | 1.5 | 1.5 | 1.5 | 1.5 | 1.5 | 1.5 | 1.5 | 1.5 |
|  | Antiaging Agent TMQ *17 | 1.0 | 1.0 | 1.0 | 1.0 | 1.0 | 1.0 | 1.0 | 1.0 | 1.0 | 1.0 | 1.0 | 1.0 |
|  | Zinc oxide | 2.5 | 2.5 | 2.5 | 2.5 | 2.5 | 2.5 | 2.5 | 2.5 | 2.5 | 2.5 | 2.5 | 2.5 |
|  | Vulcanization Accelerator TBBS *18 | 1.2 | 1.2 | 1.2 | 1.2 | 1.2 | 1.2 | 1.2 | 1.2 | 1.2 | 1.2 | 1.2 | 1.2 |
|  | Sulfur | 2.5 | 2.5 | 2.5 | 2.5 | 2.5 | 2.5 | 2.5 | 2.5 | 2.5 | 2.5 | 2.5 | 2.5 |
| Properties of Vulcanized Rubber Composition | Dynamic Elastic Modulus E' Index | 117 | 115 | 111 | 124 | 110 | 104 | 106 | 118 | 115 | 116 | 117 | 100 |
|  | tanδ Index | 88 | 94 | 92 | 93 | 98 | 84 | 89 | 88 | 90 | 90 | 89 | 100 |
| Workability | Mooney Viscosity Index | 96 | 94 | 95 | 95 | 88 | 105 | 104 | 95 | 99 | 98 | 97 | 100 |
|  | Scorch Time Index | 86 | 109 | 108 | 110 | 66 | 94 | 97 | 84 | 88 | 87 | 88 | 100 |

[Notes]
The following *1 to *18 are common to Table 3 and Table 4.

*1: RSS #1
*2: manufactured by Asahi Carbon Co., Ltd., trade name "#80".
*3: Compound a: N,N'-di-(1H-benzimidazol-2-yl)-2,2'-disulfanediylethanamine obtained in Production Example 1 and represented by the formula (IV).
*4: Compound b: N,N'-di-(1H-benzimidazol-2-yl)-3,3'-disulfanediyldipropanamide obtained in Production Example 2 and represented by the formula (V).
*5: Compound c: bis[3-(2-amino-1H-benzimidazol-1-yl)-3-oxopropyl]disulfane obtained in Production Example 3 and represented by the formula (VI).
*6: Compound d: bis[6-(2-amino-1H-benzimidazol-1-yl)-6-oxohexyl] disulfane obtained in Production Example 4 and represented by the formula (VII).
*7: Compound e: bis[2-(2,3-diphenylguanidino)ethyl]disulfane obtained in Production Example 5 and represented by the formula (VIII).
*8: Compound f: 2-[(1H-benzimidazol-2-yl)amino]acetohydrazide obtained in Production Example 6 and represented by the formula (IX).
*9: Compound g: 2-(2-amino-1H-benzimidazol-1-yl)acetohydrazide obtained in Production Example 7 and represented by the formula (X).
*10: Compound h: bis[2-(2-amino-1H-benzimidazol-1-yl)ethyl] disulfane obtained in Production Example 8 and represented by the formula (XI).
*11: Compound i: bis[2-(2-dimethylamino-1H-benzimidazol-1-yl)ethyl] disulfane obtained in Production Example 9 and represented by the formula (XII).
*12: Compound j: N,N'-di-(1H-benzimidazol-2-yl)-N,N'-dimethyl-2,2'-disulfanediyldiethanamine obtained in Production Example 10 and represented by the formula (XIII).
*13: Compound k: N, N'-di-(1H-benzimidazol-2-yl)-2,2'-[disulfanediylbis(ethyleneoxy)]diethanamine obtained in Production Example 11 and represented by the formula (XIV).

*14: Compound 1: 3-hydroxy-N'-(1,3-dimethylbutylidene)-2-naphthoic acid hydrazide (see PTL 1, Synthesis Example 2).
*15: manufactured by Fuji Kosan Co., Ltd., "Aromax #3".
*16: N-(1,3-dimethylbutyl)-N'-phenyl-p-phenylenediamine, manufactured by Ouchi Shinko Chemical Industrial Co., Ltd., trade name "Nocrac 6C".
*17: 2,2,4-Trimethyl-1,2-dihydroquinoline polymer, manufactured by Ouchi Shinko Chemical Industrial Co., Ltd., trade name "Nocrac 224".
*18: N-tert-butyl-2-benzothiazolylsulfenamide, manufactured by Sanshin Chemical Industry Co., Ltd., trade name "Sanceler NS".
*19: manufactured by JSR Corporation, trade name "JSR BR01".
*20: manufactured by Tosoh Silica Corporation, trade name "Nipsil AQ" (BET specific surface area 205 m$^2$/g).
*21: Bis(3-triethoxysilylpropyl) disulfide (mean sulfur chain length: 2.35), Evonik's silane coupling agent, trade name "Si75" (registered trademark).

As obvious from Table 3 and Table 4, the rubber compositions of Examples 1 to 11, as compared with the rubber composition of Comparative Example 1 corresponding thereto, and the rubber compositions of Examples 12 to 22, as compared with the rubber compositions of Comparative Example 2 corresponding thereto, all have a higher dynamic elastic modulus E' index and a lower tan δ index.

It was confirmed that the compounds produced in Production Examples 12 to 19 also had the same effects as those of the compounds a to k produced in Production Examples 1 to 11.

INDUSTRIAL APPLICABILITY

The rubber composition of the present invention has an excellent low-heat-generation property, and is therefore favorably used for constitutive members of various types of tires for passenger cars, small-size trucks, minivans, pickup trucks and big-size vehicles (trucks, buses, mining carts, construction vehicles, etc.) and others, especially for tread members (tread earth members, base tread members) of pneumatic radial tires for big-size vehicles.

The invention claimed is:

1. A rubber composition prepared by mixing, per 100 parts by mass of a rubber component comprising at least 50% by mass of a diene-based rubber, from 20 to 150 parts by mass of a filler, and from 0.05 to 30 parts by mass of a compound A which has a guanidine structure represented by the following formula (I) and has a functional group reactive with the diene-based rubber

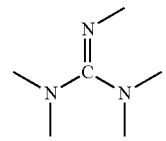

(I)

wherein the compound A is at least one selected from the group consisting of N,N-di-(1H-benzimidazol-2-yl)-2,2'-disulfandiylethanamine, N,N'-di-(1H-benzimidazol-2-yl)-3,3'-disulfanediyldipropanamide, bis[3-(2-amino-1H-benzimidazol-1-yl)-3-oxopropyl]disulfane, bis[6-(2-amino-1H-benzimidazol-1-yl)-6-oxohexyl]disulfane, and a compound represented by the following formulae (XVIII) and (XX)

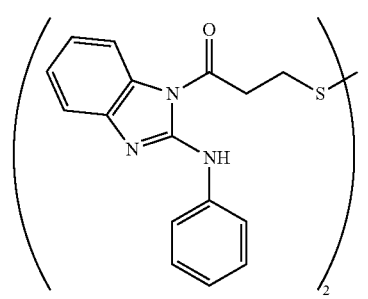

(XVIII)

2. The rubber composition according to claim 1, wherein the filler comprises, per 100 parts by mass of the rubber component, from 20 to 70 parts by mass of carbon black and from 0 to 80 parts by mass of an inorganic filler.

3. The rubber composition according to claim 1, wherein the guanidine structure is a structure having an amide structure represented by the following formula (III):

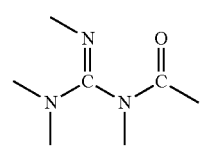

(III)

4. A pneumatic tire using the rubber composition of claim 1.

* * * * *

UNITED STATES PATENT AND TRADEMARK OFFICE
CERTIFICATE OF CORRECTION

PATENT NO. : 10,053,553 B2  
APPLICATION NO. : 14/764205  
DATED : August 21, 2018  
INVENTOR(S) : Noriaki Yukimura et al.

Page 1 of 1

It is certified that error appears in the above-identified patent and that said Letters Patent is hereby corrected as shown below:

In the Claims

Column 36 Line 30 Claim 1, last line (after formula (XVIII)), please insert formula (XX):

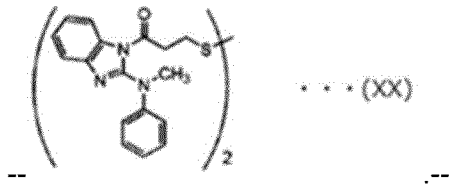

--                         .--

Signed and Sealed this  
Twentieth Day of November, 2018

Andrei Iancu  
*Director of the United States Patent and Trademark Office*